May 8, 1962  A. W. GAUBATZ  3,032,982
TILTING JET NOZZLE
Filed Oct. 4, 1960  2 Sheets-Sheet 1
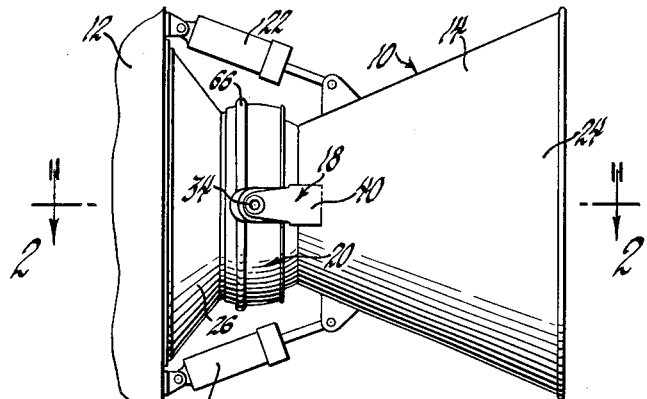
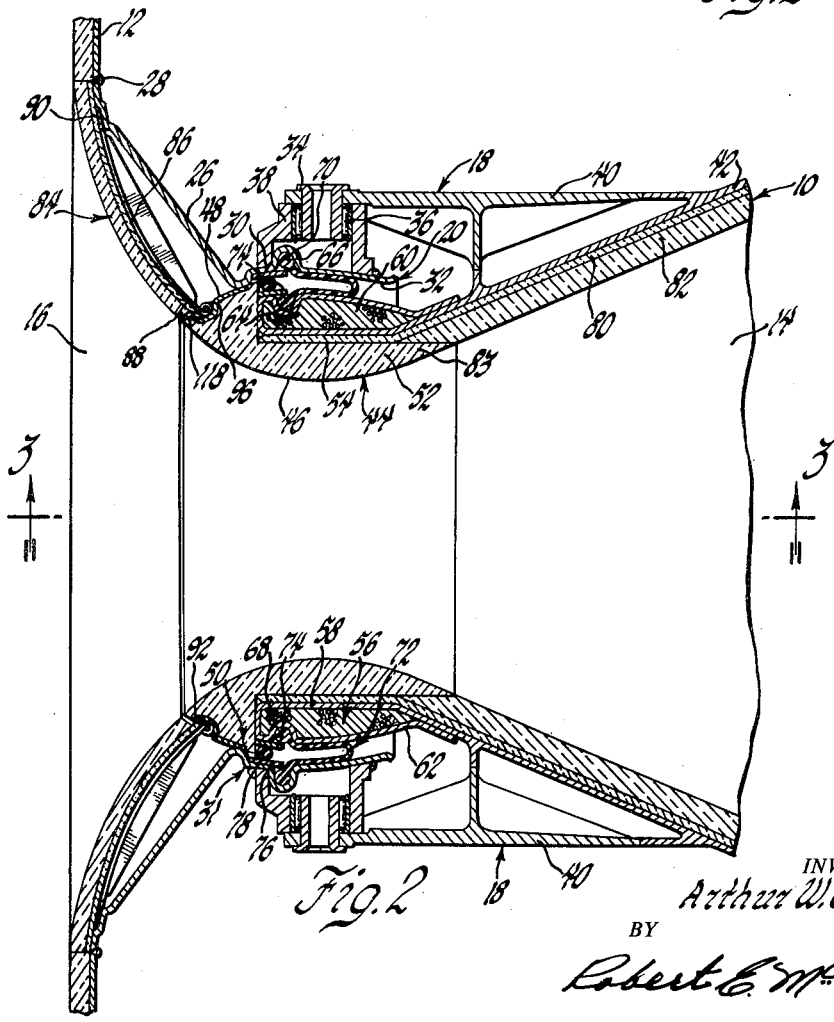
INVENTOR.
Arthur W. Gaubatz
BY
Robert E. McCollum
ATTORNEY

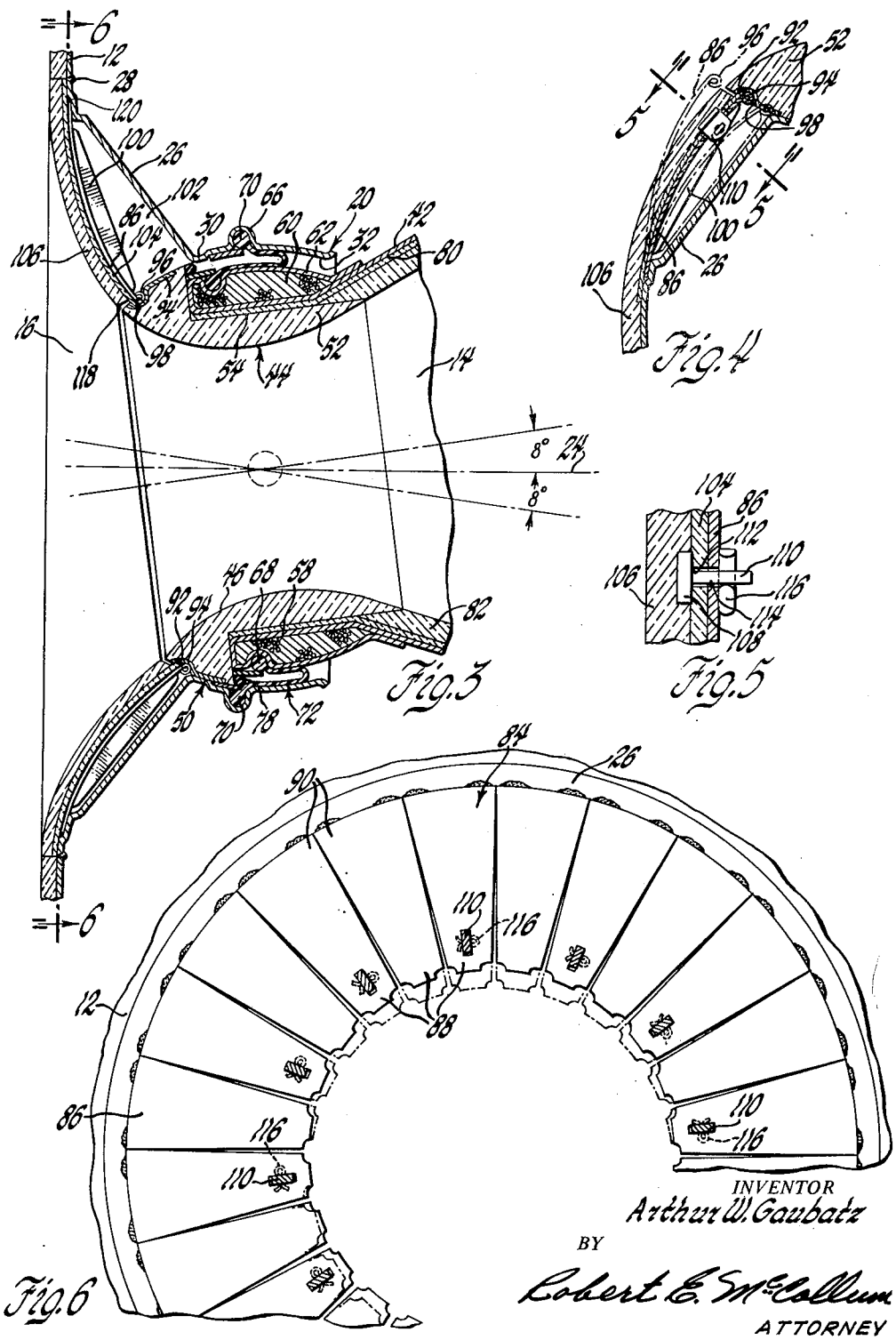

3,032,982
TILTING JET NOZZLE
Arthur W. Gaubatz, Indianapolis, Ind., assignor to General Motors Corporation, Detroit, Mich., a corporation of Delaware
Filed Oct. 4, 1960, Ser. No. 60,357
6 Claims. (Cl. 60—35.55)

This invention relates to a tilting exhaust nozzle for a jet engine. More particularly, the invention relates to the construction of the throat inlet of a convergent-divergent type swivel nozzle for continuously providing a smooth clean flow path into the throat regardless of the position of the nozzle.

In prior swivel type nozzle constructions, the pivotal movement of the nozzle in most instances resulted in part of the forward edge of the moveable portion projecting out into the fluid exhaust stream. This choked off the exhaust passage and decreased the volume of flow through the nozzle.

The present invention maintains a smooth clean flow path through the nozzle at all times. This is accomplished by constructing the throat inlet of a number of circumferentially arranged and separated flexible members connected at opposite ends to the stationary and moveable portions of the nozzle. The members flex or bend upon pivotal movement of the nozzle and always maintain the parts in substantially the same position relative to each other to always provide a smooth fluid flow path through the nozzle throat.

Therefore, it is an object of this invention to provide a tilting jet nozzle of a construction always providing a smooth streamlined fluid flow path through the nozzle regardless of the pivotal position of the nozzle.

Other features, objects, and advantages will become apparent upon reference to the succeeding detailed description of the invention and to the drawings illustrating the preferred embodiment thereof, wherein:

FIG. 1 is a plan view of a nozzle embodying the invention;

FIG. 2 is an enlarged cross-sectional view of the nozzle of FIG. 1 taken on a plane indicated by and viewed in the direction of the arrows 2—2 of FIG. 1;

FIG. 3 is a cross-sectional view taken on a plane indicated by and viewed in the direction of the arrows 3—3 of FIG. 2 illustrating the nozzle pivoted to another operative position;

FIG. 4 is a view of a detail of FIG. 3;

FIG. 5 is an enlarged cross-sectional view of a detail of FIG. 4 taken on a plane indicated by and viewed in the direction of the arrows 5—5 of FIG. 4; and FIG. 6 is an end view of a portion of the nozzle of FIG. 3 viewed in the direction of the arrows 6—6 of FIG. 3.

The drawings, and particularly FIG. 1, illustrate a fluid nozzle 10 which is intended, in this instance, primarily for use with a rocket casing to together form a rocket engine. Only the aft portion of the rocket casing is shown as the stationary member 12. It will be clear of course that the nozzle could be used in many other installations and combinations within the scope of the invention. The nozzle 10 includes an annular diverging tilting portion 14 axially aligned with and pivotally connected for a swivel movement in one plane within a stationary annular converging portion 16 by means of two trunnion mounts 18. The moveable and stationary nozzle portions are interfitted by a ball and socket type fitting 20. The nozzle portion 14 is actuated to its different positions by a number of hydraulic actuators 22 connected at opposite ends to the moveable nozzle portion and stationary rocket casing 12, respectively. The trunnion mounts 18 and actuators 22 permit pivotal movement of the nozzle through a total arc of 16 degrees or plus or minus 8 degrees to either side of the longitudinal or neutral nozzle axis 24, and, of course, permit any smaller degree of movement desired.

Therefore, as thus far described, the nozzle swivel portion 14 may be tilted to variably direct the flow of fluid from the nozzle for vectoring purposes.

More specifically, the stationary nozzle portion 16 includes a hollow frusto-conical casing 26 welded at one edge 28 to the rocket casing 12. At its other edge, casing 26 is extended and arcuately curved as shown to form the casing 30 of a hollow spherical zone 31. Zone 31 has an inner surface 32 concave in cross-section and constituting the socket of the ball and socket type fitting 20.

The swivel nozzle portion 14 is, as stated previously, mounted for a pivotal movement within zone 31 and is supported therefrom by the two trunnion mounts 18 on opposite sides of the nozzle. Each of the trunnion mounts has a hollow pivot pin 34 rotatably mounted within bearings 36 secured within the bore of a supporting sleeve 38. Sleeve 38 is welded to the stationary casing 30. Each of the pivot pins 34 is in turn fixed to an ear 40 extending and welded to the outer surface of the diverging hollow frusto-conical casing 42 of swivel nozzle portion 14.

The fluid inlet end of casing 42 is arcuately formed to provide a tubular member 44 having both an internal surface or wall 46 and an outer surface or wall 48, both walls being convex in cross section. Internal wall 46 both converges and diverges in cross-section to constitute a nozzle throat or venturi of minimum area in between. The outer wall 48 constitutes the outer bearing surface of a spherical zone 50 and is slideably nested within surface 32 of zone 31. Zone 50 thus forms the ball member of the ball-and-socket type fiting 20. A cross section through the body portion 52 of the tube member 44 reveals it to be substantially oval to provide the two surface contours described, and it is formed from a high heat resistant and insulating material such as tungsten or graphite, for example.

Body portion 52 is recessed or cut away at 54 not only to provide a space for connecting the zone to the divergent casing 42, but also to provide space for mounting therein the moveable portion of a fluid seal 56 between the moveable and stationary nozzle portions. The upstream end of casing 42 is extended to form a hollow cylindrical portion 58 of a diameter slightly greater than that of the recess 54. Cylindrical portion 58 is flanged at its upstream end and bent 180 degrees as shown to lay back on itself and thus form an annular closed or dead end chamber 60 adapted to be filled with insulating material, such as Vermiculite. The outer surface 62 of the chamber is arcuately formed to conform to the inner surface 32 of zone 31. Both surface 62 and surface 32 are circumferentially grooved at 64 and 66, respectively, to receive the beaded ends 68 and 70 of a rolling fabric seal 72. The ends 68 and 70 are positively held in place by closing annular lip flanges 74 and 76 over the grooves. The seal may be run as a gas bag or filled with grease. If filled with grease, an "O-Ring" type seal 78 is positioned between the lip flanges and abuts the body portion 46 to retain a stiff mixture of silicone grease and thickener insulation such as powdered asbestos which would be injected into the space between the folds of the rolling seal 72. The fabric seal preferably is made of fiber glass impregnated with a silicone rubber compound although other compositions could be used without departing from the scope of the invention. The arcuately formed surfaces which the seal abuts of course aid in effecting rolling of the fabric seal, and the center of the line of action of the fabric seal is aligned with the center of rotation of the zone to prevent damage to the seal when it rolls.

Both cylindrical portion 58 and the casing 42 have a continuous annular primary coat of insulation 80 bonded on their inner surfaces. Casing 42 has a further thick insulating liner 82 bonded to the primary coat, and its upstream end forms a smooth extension with the edge of the projecting end 83 of body 52. The liner 82 may be of graphite or tungsten similar to body portion 46.

As thus far described, therefore, the diverging swivel nozzle portion 14 pivots about the pins 34 to a maximum of eight degrees from the neutral axis 24, the ball member or zone 50 arcuately moving within the socket or zone 31 about the pins from the position shown in FIG. 2 to the extreme position shown in FIG. 3. The bag or rolling fabric seal 56 at this time also rolls on the surfaces between the positions shown.

The most efficient operation of a nozzle requires that the fluid passage through the nozzle inlet, throat, and outlet be as smooth and streamlined as possible without obstructions or projecting portions, which would increase drag, choke the passage, and decrease the possible fluid flow volume. As stated previously, the inner surface 46 of body portion 52 of member 44 has a smooth convex face in cross-section forming the nozzle throat section with converging and diverging portions extending on opposite sides therefrom. The body portion 52 is also blended smoothly with the insulating liner 82 attached to the diverging casing 42 to provide a clean diverging fluid passage.

At its fluid inlet end, member 44 must be joined to the converging stationary casing portion 12 in a manner to provide a streamlined flow path at all times regardless of the position of the nozzle. To accomplish this, as best seen in FIG. 6, the internal wall of the converging nozzle portion is formed by an annular flexible diaphragm type member 84. Member 84 is welded at one edge to the stationary rocket casing 12 and at the other edge is pivotally joined to the edge of member 44 of the movable nozzle portion.

Member 84 is composed of a plurality of individual very thin sheet metal leaf members 86 each trapezoidal in shape with the narrow end 88 extending downstream. The leaves are all mounted in the same radial plane and are circumferentially arranged to abut at their wide ends 90, which are each welded or otherwise fixedly secured to the rocket casing 12. The leaves are circumferentially separated from each other at their narrow ends to provide clearance to allow maximum travel of the diaphragm sectors in a manner to be described. The narrow ends 88 are each hingedly mounted in a circumferential groove 92 (FIG. 4) in the outer surface 48 of member 44, which is fitted with a suitably formed annular wear member 94. The leaf members 86 are beaded at their ends 96 to pivot or rock in the slight recess 98 in the wear member 94 and move arcuately from the centered position shown in full lines in FIGS. 4 and 6 to the opposite extremes shown in dotted lines upon pivoting of the swivel nozzle portion to change the circumferential distance between the members. Sliding between leaves is eliminated by the leaf hinge point at 98, the connection of the header 14 to the rocket casing, and the center of rotation of the spherical joint all being aligned. Each leaf member is reinforced by a stiffening rib 100, and the leaves are backed up by the header or conical casing 26 to provide a dead end chamber 102 behind the leaves. With this construction, gas can leak from the gas stream into this chamber at the hinge point 98 and build up in pressure against the leaf members until it approximately balances the pressure of the nozzle gases acting on the leaves to permit the flexible member to serve solely as a guide for the gas stream.

Each of the ends 96 of the leaves is dropped into place in the groove 98 and held in place by primary and secondary flexible insulation coatings 104 and 106 secured to the leaf members in the manner as seen in FIG. 5. Each of the insulations 104 and 106 is molded as a continuous annular flexible ablative coating of suitable material, such as, for example the primary coating being of Durez with the liner being of spun quartz with a phenolic binder. The liner 106 is formed with the heads 108 of a number of clips 110 molded therein, the clips projecting through slots 112 and 114 in the primary coating 104 and leaf members 86, and secured to the leaf members by cotter pins 116. The linings are flexible to the extent that they permit local flexing or bowing of the leaf members upon swivel movement of the movable nozzle portion, while remaining a continuous heat resistant surface.

The insulation liner 106 is formed as a continuation of the insulation secured to the rocket casing, and the hinged connections of the leaf members are located such that with the insulation applied, the edge 118 of the insulation 106 is flush with the leading edge of the body portion 52 of member 44.

While the leaves have been described as having circumferentially abutting wide ends 90, it will be clear that these ends could be circumferentially separated, or that alternate ones of the leaf members as seen in FIG. 6 could be eliminated without departing from the scope of the invention, since the leaf members are secured at both ends and covered by the insulation.

This portion of the nozzle operates in the following manner. Upon pivotal movement of the movable nozzle portion 14 from the position indicated in FIG. 2 to that in FIG. 3, the leaf members flex and arcuately pivot about the outer stationary point 120, with the hinged end rocking in the groove 98 to maintain the liner 106 and the edge of the convex inner surface 46 of body portion 52 flush with each other to always maintain a streamlined inlet throat passage regardless of the nozzle position. It is to be noted that the leaf members are of such thin metal that the stiffening ribs 100 merely strengthen the plates and do not prevent the slight flexing or bowing of the plates. Since the nozzle pivots only eight degrees to either side of the neutral axis, the amount of bowing of the leaf members will be small.

From the foregoing, therefore, it will be seen that this invention provides a tilting convergent-divergent jet nozzle constructed in a manner to always provide the smoothest flow of fluid therethrough.

While the invention has been illustrated in its preferred form in the figures, it will be obvious to those skilled in the art to which this invention pertains that many modifications may be made thereto without departing from the scope of the invention.

I claim:

1. A jet nozzle for a reaction motor exhaust duct comprising axially aligned hollow annular convergent and divergent portions pivotally connected to each other for a tilting movement of said divergent portion as a whole with respect to said convergent portion, said portions together defining a longitudinally extending fluid passage within said portions, said convergent portion including an annular flexible member having one edge connected to said convergent nozzle portion and its other edge connected to the adjacent edge of said divergent portion, said member connections and the flexure of said member affording a substantially continuous smooth and streamlined longitudinally extending surface to said passage at all relative pivotal positions of said portions.

2. A jet nozzle for a reaction motor exhaust duct comprising axially aligned hollow annular convergent and divergent portions pivotally connected to each other for a tilting movement of said divergent portion as a whole with respect to said convergent portion, said portions together defining a longitudinally extending fluid passage within said portions, said convergent portion including an annular flexible diaphragm member having one edge fixedly connected to said convergent nozzle portion and its other edge pivotally connected to the adjacent edge of said divergent portion, said member connections and the flexure of said member affording a substantially continuous smooth and streamlined longitudinally extending surface to said passage at all relative pivotal positions of said portions.

3. A jet nozzle for a reaction motor exhaust duct comprising axially aligned hollow annular convergent and divergent portions pivotally connected to each other for a tilting movement of said divergent portion as a whole with respect to said convergent portion, said portions together defining a longitudinally extending fluid passage within said portions, said convergent portion including an annular flexible member having one edge connected to said convergent nozzle portion and its other edge connected to the adjacent edge of said divergent portion, said member connections and the flexure of said member affording a substantially continuous smooth and streamlined surface to said passage at all relative pivotal positions of said portions, said member comprising a plurality of circumferentially arranged flexible longitudinally extending leaf segments each joined to the convergent portion at one end and being pivotally connected to a part of the divergent portion at the other end, the pivotal movement of said portions flexing said segments to maintain the passage surface and flow path longitudinally streamlined.

4. A jet nozzle for a reaction motor exhaust duct comprising axially aligned hollow annular convergent and divergent portions pivotally connected to each other for a tilting movement of said divergent portion as a whole with respect to said convergent portion, said portions together defining a longitudinally extending fluid passage within said portions, said convergent portion including an annular flexible member having one edge connected to said convergent nozzle portion and its other edge connected to the adjacent edge of said divergent portion, said member connections and the flexure of said member affording a substantially continuous smooth and streamlined surface to said passage at all relative pivotal positions of said portions, said member comprising a plurality of circumferentially arranged and separated flexible thin plates each fixedly connected at one end to said convergent portion and pivotally connected at its opposite end to a part of said converging portion, said plates extending and tapering in the direction of the longitudinal axis of said nozzle, the pivotal relative movement of said portions flexing said plates and changing the circumferential separation of the other ends of said plates to maintain the passage surface and flow path longitudinally streamlined.

5. A jet nozzle for a reaction motor exhaust duct comprising axially aligned hollow annular convergent and divergent portions pivotally connected to each other for a tilting movement of said divergent portion as a whole with respect to said convergent portion, said portions together defining a longitudinally extending fluid passage within said portions, said convergent portion including an annular flexible member having one edge connected to said convergent nozzle portion and its other edge connected to the adjacent edge of said divergent portion, said member connections and the flexure of said member affording a substantially continuous smooth and streamlined surface to said passage at all relative pivotal positions of said portions, said member comprising a plurality of circumferentially arranged and separated flexible thin plates each fixedly connected at one end to said convergent portion and pivotally connected at its opposite end to a part of said converging portion, said plates extending and tapering in the direction of the longitudinal axis of said nozzle, the pivotal relative movement of said portions flexing said plates and changing the circumferential separation of the other ends of said plates to maintain the passage surface and flow path longitudinally streamlined, the radial distance of the other end of said plates from said longitudinal nozzle axis changing with a change in the pivotal movement of said portions.

6. A jet nozzle for a reaction motor exhaust duct comprising axially aligned hollow annular convergent and divergent portions pivotally connected to each other for a tilting movement of said divergent portion as a whole with respect to said convergent portion, said portions together defining a longitudinally extending fluid passage within said portions, said convergent portion including an annular flexible member having one edge connected to said convergent nozzle portion and its other edge connected to the adjacent edge of said divergent portion, said member connections and the flexure of said member affording a substantially continuous smooth and streamlined surface to said passage at all relative pivotal positions of said portions, said member comprising a plurality of circumferentially arranged and separated flexible thin plates each fixedly connected at one end to said convergent portion and pivotally connected at its opposite end to a part of said converging portion, said plates extending and tapering in the direction of the longitudinal axis of said nozzle, the pivotal relative movement of said portions flexing said plates and changing the circumferential separation of the other ends of said plates to maintain the passage surface and flow path longitudinally streamlined, the connection of said flexible member to said divergent portion effecting leakage of fluid under pressure from said passage into contact with the side of said member opposite to that normally in contact with said fluid to balance the fluid forces acting on opposite sides thereof, the points of connection of the ends of the said plates and the center of rotation of the pivotal portion being aligned to prevent sliding between the plates.

References Cited in the file of this patent
UNITED STATES PATENTS

| | | |
|---|---|---|
| 2,846,844 | O'Rourke | Aug. 12, 1958 |
| 2,923,127 | Biehl et al. | Feb. 2, 1960 |
| 2,926,491 | Hyde | Mar. 1, 1960 |